United States Patent
Yoon et al.

(10) Patent No.: US 7,299,178 B2
(45) Date of Patent: Nov. 20, 2007

(54) CONTINUOUS SPEECH RECOGNITION METHOD AND SYSTEM USING INTER-WORD PHONETIC INFORMATION

(75) Inventors: Su-yeon Yoon, Seoul (KR); In-jeong Choi, Gyeonggi-do (KR); Nam-hoon Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 814 days.

(21) Appl. No.: 10/784,173

(22) Filed: Feb. 24, 2004

(65) Prior Publication Data

US 2004/0172247 A1    Sep. 2, 2004

(30) Foreign Application Priority Data

Feb. 24, 2003    (KR) .................. 10-2003-0011345

(51) Int. Cl.
*G10L 15/00*    (2006.01)
(52) U.S. Cl. ...................... 704/251; 704/254
(58) Field of Classification Search ............ 704/251, 704/254

See application file for complete search history.

(56) References Cited

U.S. PATENT DOCUMENTS 5,170,432 A * 12/1992 Hackbarth et al. .......... 704/254
5,536,171 A * 7/1996 Javkin et al. ................ 434/185
5,875,426 A * 2/1999 Bahl et al. ................... 704/255
5,995,931 A * 11/1999 Bahl et al. ................... 704/257

* cited by examiner

*Primary Examiner*—Daniel Abebe
(74) *Attorney, Agent, or Firm*—Buchanan Ingersoll & Rooney PC

(57) ABSTRACT

A continuous speech recognition method and system are provided. The continuous speech recognition method includes constructing a pronunciation dictionary database including at least one pronunciation representation for each word which is influenced by applying phonological rules, wherein the pronunciation representation for the coda of a first word or the pronunciation representation for the onset of a second word following the first word is additionally indexed with an identifier if it does not match the phonetic pronunciation of its spelling, forming inter-word phonetic information in matrix form by combination of a number of all probable phonetic pairs, each of which is basically comprised of the coda of a first word and the onset of a second word following the first word, wherein the coda of the first word or the onset of the second word is indexed with an identifier if they undergo phonological changes and performing speech recognition on feature vectors extracted from an input speech signal with reference to the pronunciation dictionary database and the inter-word phonetic information.

8 Claims, 6 Drawing Sheets

CONTINUOUS SPEECH RECOGNITION METHOD AND SYSTEM USING INTER-WORD PHONETIC INFORMATION

BACKGROUND OF THE INVENTION

This application claims priority from Korean Patent Application No. 2003-11345, filed on Feb. 24, 2003, in the Korean Intellectual Property Office, the disclosure of which is incorporated herein in its entirety by reference.

1. Field of the Invention

The present invention relates to speech recognition, and more particularly, to a speech recognition method and system using inter-word phonetic information.

2. Description of the Related Art

A general continuous speech recognition system has a structure as illustrated in FIG. 1. Referring to FIG. 1, a feature extraction unit 11 extracts feature vectors, which represents input speech data in a form suitable for speech recognition system. With an acoustic model database 13, a pronunciation dictionary database 14, and a language model database 15, which are previously established through learning processes, a search unit 12 takes the feature vectors and computes which word sequences most likely produce. In Large Vocabulary Continuous Speech Recognition (LVCSR), words searched by the search unit 12 have a form as tree structure. A post-processing unit 16 removes the phonetic representations and tags from what has resulted in search unit 12, then symbolize it in terms of syllable, and finally produces hypothesis in text form.

Examples of Korean and English words and their possible pronunciation representations stored in the pronunciation dictionary database 13 are shown in FIGS. 2A and 2B. As shown in FIG. 2A, the word "대학[dehak]" 21, which means a university, may takes its pronunciation representation as either one of following; [dehak] 21a, [dehaŋ] 21b, and [dehag] 21c. When it comes to the word "대항[dehaŋ]" 22, as is another word example, it means an opposition and its pronunciation can be represented as [dehaŋ] 22a. But, it is almost impossible to distinguish pronunciation representations between [dehaŋ] 22b and "대항[dehaŋ]" 22a in that the both of pronunciation representations are identical. Referring to FIG. 2B, the word "seat" 23 may take its pronunciation representation either [sit] 23a or [sip] 23b. However, the pronunciation representation [sip] 23b is substantially indistinguishable from the pronunciation representation [tip] 24a for the word "tip" 24.

An example of search process with the pronunciation dictionary database 14 in the search unit 12 will be described in FIG. 3. In order to recognize the word sequence, "한국대학이[hanguk dehak I]", each of words, "hanguk", "dehak", and "i" is commonly fractionized into onset, which is initial consonants in syllable, nucleus, which is phonetically steady portion, and coda, which is final consonants in syllable. Here is an example for further understanding. First of all, when it comes to the word, "한국[hanguk]", a pronunciation sequence is generated with possible onset 31, and coda 33 except nucleus, [angu] 32. Next, in the case of word, "대학[dehak]", as a similar manner, a pronunciation sequence is generated with possible onset and coda 34 and 36 except nucleus, [eha] 35. The pronunciation representation 37 for the word "이[i]" is generated. A subsequent searching process is performed on the generated presentation representations with the probability functions Pr(대학[dehak]|한국[hanguk]) and Pr(이[i]|대학[dehak]). There are two combinations between the words "한국" and "대학". In addition, there are three combinations between the words "대학" and "이". The word "한국" means a Korean and "이" takes a role as an auxiliary word for a subjective case.

For building up Large Vocabulary Continuous Speech Recognition (LVCSR) system, a pronunciation dictionary, which represents words of interest, should be defined ahead. In general, coarticulation effects frequently happen either between phonemes or between words. When coarticulatrion effects appear at the boundary of successive words, each of words cannot be correctly recognized, but it could also have variations of acoustic properties in line with neighborhood context. Accordingly, these phenomena must be considered in modeling pronunciation dictionary for speech.

In particular, various phonological changes appear saliently in Korean spoken language depending on the phonemic context. Accordingly, there is a need to provide various pronunciation representations for each word based on such phonological changes. In general, intra-word pronunciation representations have substantially constant phonemic contexts, so that they can be easily modeled based on phonological rules through learning, for example, using triphone models. However, inter-word phonemic contexts vary depending on the surrounding words, so that more delicate modeling is required to reflect the complicated relevant phonological rules.

To consider inter-word phonological changes, multiple pronunciation representations for each word, including all or major probable inter-word phonemic contexts, may be incorporated to build up a dictionary. Alternatively, a method of modeling inter-word phonological variations by use of more mixed Gaussian functions providing more state outputs to a HMM may be used. However, the former method expands the sizes of the dictionary and network. The latter method requires substantial computational processing and time and leads to a slow recognition rate. There is another method involving selecting more frequent inter-word phonological changes and applying language model-based, modified phonemic contexts to a recognition network using a crossword triphone model. In this method, multiple begin nodes are assigned to each word so as to consider its various phonemic contexts with the preceding word. As a result, this method drops sharing efficiency in tree-structured recognition networks and leads to extensive network size. Furthermore, in a method of using a tree-structure recognition network where the leading phonemic contexts of words are applied during recognition, not prior to recognition, when there are more than one alternative phonology rules which are applicable in a particular phonological environment, limitation to one of them is impossible. In addition, this method increases the computational load because pronunciation rules must be applied on a frame by frame basis and the recognition network must be continuously updated during recognition.

SUMMARY OF THE INVENTION

The present invention provides a continuous speech recognition method, which eliminates phonologically inappropriate connections between pronunciation representations based on the inter-word phonetic information with an identifier, when a spelling of words is different from the representation of phonetic pronunciations.

The present invention also provides a system which performs the continuous speech recognition method based on the inter-word phonetic information.

In one aspect, the present invention provides a continuous speech recognition method comprising: (a) constructing a pronunciation dictionary database including at least one pronunciation representation for each word which is influenced by applying phonological rules, wherein the pronunciation representation for a coda of the last syllable of a first word or the pronunciation representation for an onset of the initial syllable of a second word following the first word is additionally indexed with an identifier if it does not match the phonetic pronunciation of its spelling; (b) forming inter-word phonetic information in matrix form by combination of a number of all probable phonetic pairs, each of which is basically comprised of the coda of a first word and the onset of a second word following the first word, wherein the coda of the first word or the onset of the second word is indexed with an identifier if they undergo phonological changes; and (c) performing speech recognition on feature vectors extracted from an input speech signal with reference to the pronunciation dictionary database and the inter-word phonetic information.

In step (c), a pronunciation representation for the coda of a first word and a pronunciation representation for the onset of a second word following the first word, which do not comply with the phonological rules, may be constrained based on the inter-word phonetic information so as not to be linked to each other.

In another aspect, the present invention provides a continuous speech recognition system having an acoustic model database and a language model database which are previously established through learning, the system including: an inter-word phonetic information storing unit which stores inter-word phonetic information by combination of all probable phonemic pairs, each of which is basically comprised of a coda of last syllable of a first word and an onset of initial syllable of a second word following the first word, wherein the coda of the first word or the onset of the second word is indexed with an identifier if it does not match the phonetic pronunciation of its spelling due to phonological interaction between the first and second words; a pronunciation dictionary database including at least one pronunciation representation for each word based on phonological rules, wherein the pronunciation representation for the coda of a first word or the pronunciation representation for the onset of a second word following the first word is additionally indexed with an identifier if it does not match the phonetic pronunciation of the spelling; a feature extraction unit which extracts information that is useful for recognition from an input speech signal and converts the extracted information into feature vectors; and a search unit which searches most likely word sequences among from the feature vectors obtained in the feature extraction unit using the inter-word phonetic information and with reference to the acoustic model database, the pronunciation dictionary database, and the language model database, and outputs the most likely word sequences in text form as a recognition result.

The continuous speech recognition system may further include a post-processing unit which converts an intra-word biphone model into an inter-word triphone model, rescores the acoustic models for the most likely word sequences obtained in the search unit, recalculates the scores of candidate sentences, and selects the best candidate sentence as a recognition result.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
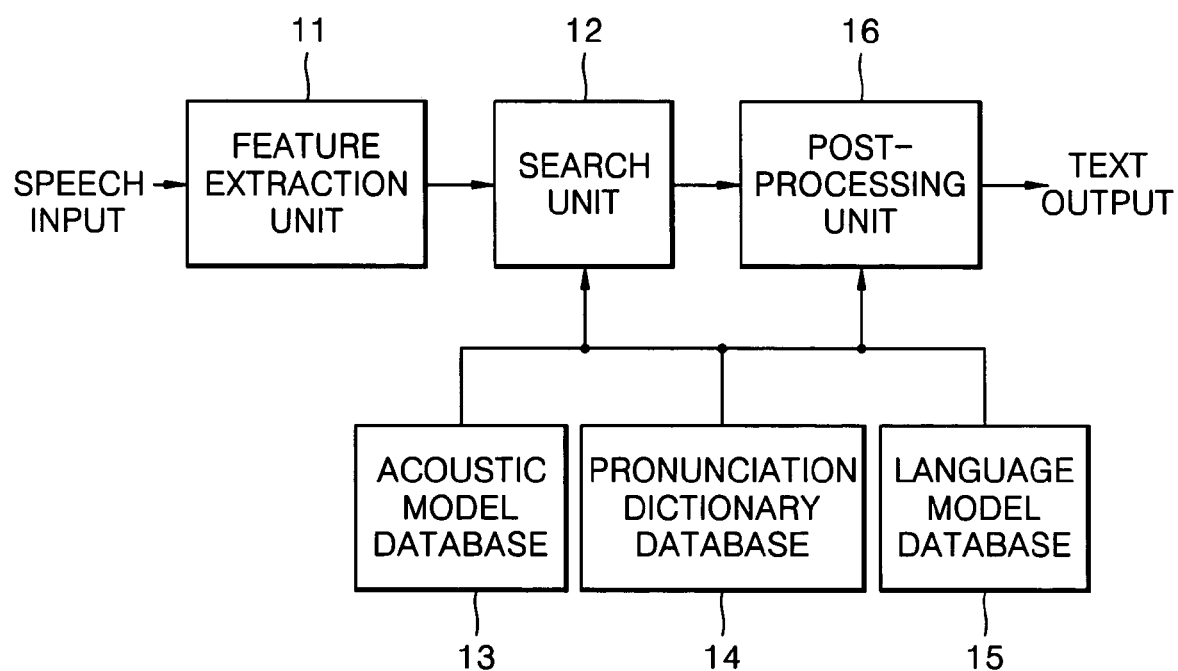
FIG. 1 is a block diagram of a general continuous speech recognition system.
Figure 2A:
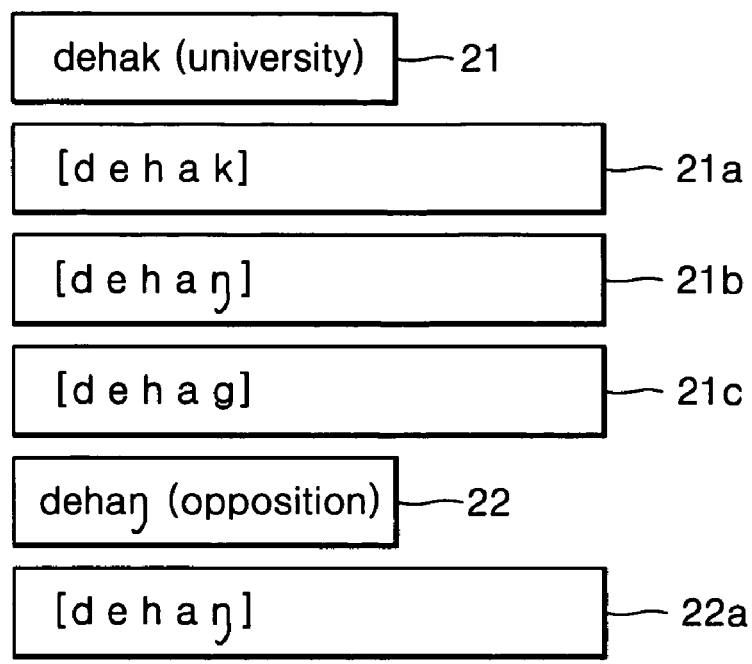
FIGS. 2A and 2B illustrate examples of pronunciation representations stored in a pronunciation dictionary in FIG. 1.
Figure 2B:
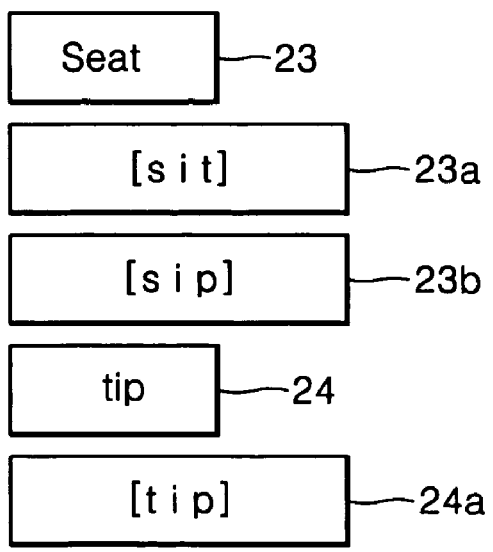
Figure 3:
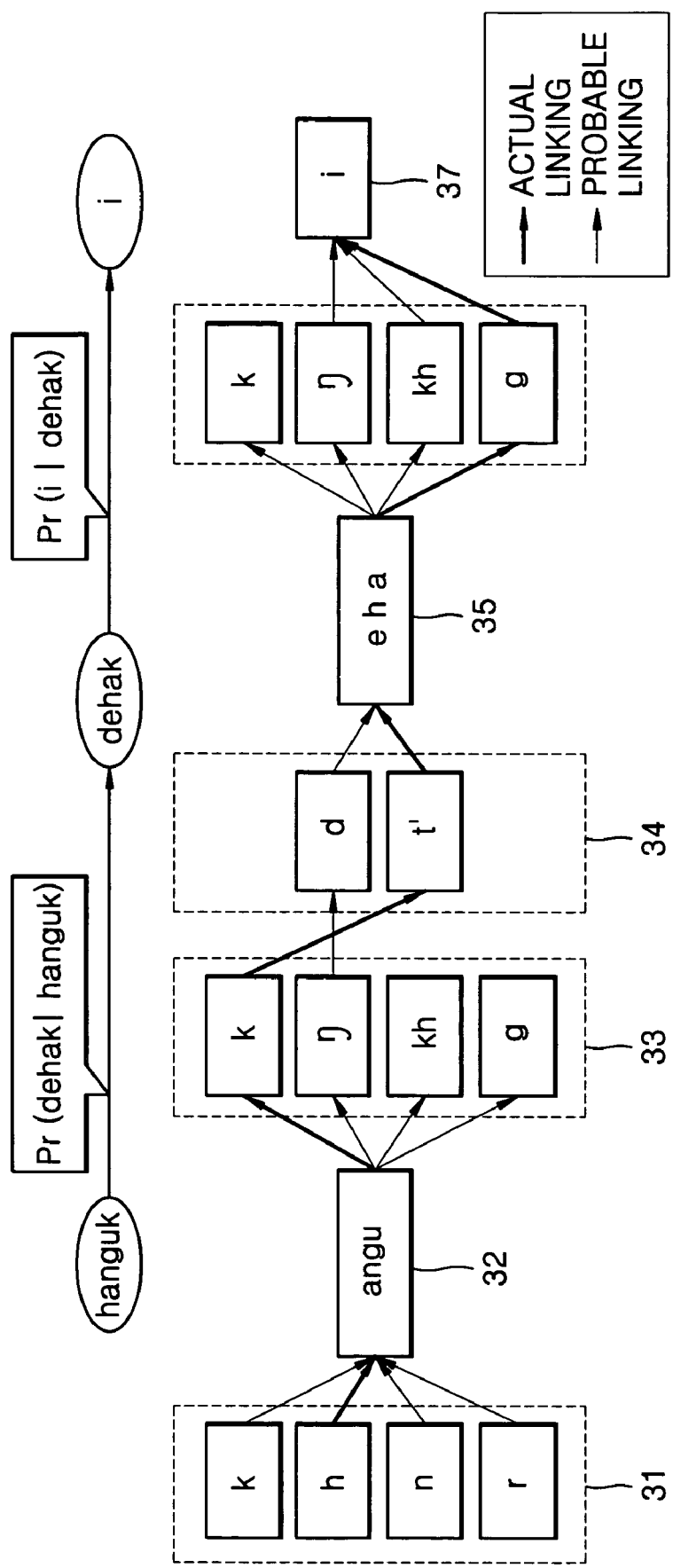
FIG. 3 is a diagram for explaining the operation of a search unit in FIG. 1.
Figure 4:
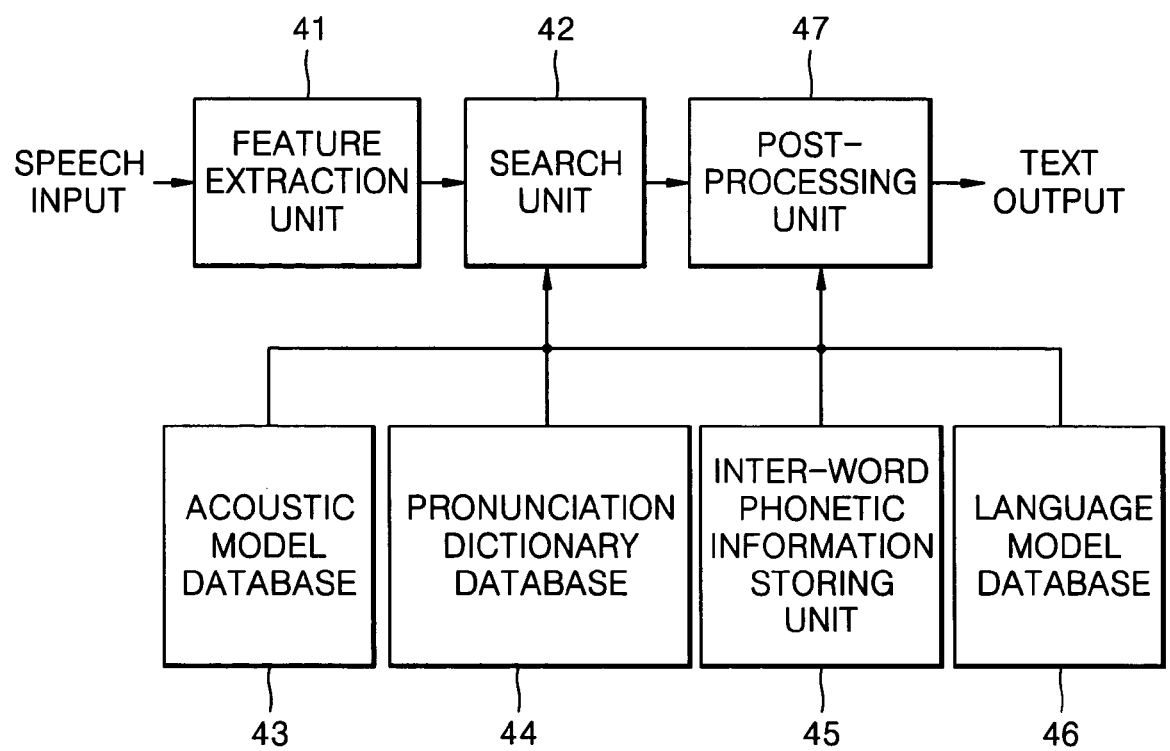
FIG. 4 is a block diagram of a continuous speech recognition system according to an embodiment of the present invention.

Referring to FIG. 4, a continuous speech recognition system according to an embodiment of the present invention includes a feature extraction unit 41, a search unit 42, an acoustic model database 43, a pronunciation dictionary database 44, an inter-word phonetic information storing unit 45, a language model database 46, and a post-processing unit 47.

The feature extraction unit 41 extracts effective feature vectors from a speech signal, which is digitized via pre-processing, such as environmental adaptation, end point detection, echo removal, or noise removal. General methods for the feature vector extraction include cepstrum extraction and a method using human's hearing recognition mechanism-based Mel-Frequency Cepstrum Coefficients (MFCC), the latter becoming more popular recently. Cepstrum extraction results in feature vectors having lower-order terms reflecting the features of a speaker's vocal tract upon speaking and higher-order terms reflecting the features of a speech excitation signal.

The search unit 42 searches for most likelihood word sequences among from the feature vectors using Viterbi algorithms and with reference to inter-word phonetic information stored in the inter-word phonetic information storing unit 45, which is described later, and the acoustic model database 43, the pronunciation dictionary database 44, and the language model database 46, which are previously established through learning. Vocabularies searched by the search unit 42 have tree structures for recognition of a large vocabulary. The search unit 42 searches the trees of words by combination of the words in the pronunciation dictionary database 44 with reference to data on the frequency of use of words and data on the probability of use of words, both of which correspond to an acoustic difference obtained from the acoustic model database 43, to obtain N best candidate word sequences.

The acoustic model database 43 constructs acoustic models, such as Hidden Markov Models (HMM), using user's feature vectors extracted from acoustic data of a training vocal database. These acoustic models are used as reference models during speech recognition.

The pronunciation dictionary database 44 includes all probable pronunciation representations for each word according to relevant phonological rules so as to enable inter-word phonological rule based recognition. An additional identifier is added to a pronunciation representation for a word having an onset or coda that does not match the spelling due to phonetic interaction with the coda of the last syllable of the preceding word or the onset of the initial syllable of the following word.

The inter-word phonetic information storing unit 45 stores as inter-word phonetic information in a matrix form a series of phonemic pairs, which appear between words under phonological rules. Each phonemic pair is basically comprised of the coda of the last syllable of a first word and the onset of the initial syllable of a second word following the first word. The coda of the last syllable of the first word and the onset of the initial syllable of the second word, which form a phonemic pair, are indexed by identifiers when they undergo phonological changes. Such a phoneme with an identifier is referred to as "secondary phoneme". In general, phonological changes occur in particular phonemic pairs, not all phonemic pairs, according to predetermined phonological rules. In other words, by understanding practical phonemic change rules between compound words or between syllables, inter-word phonological changes can be modeled with considerable accuracy. Typical phonological changes occurring between words include substitution, insertion, and deletion. Substitution refers to the replacement of both or one of adjacent consonants with another consonant due to nasaliation of an obstruent or liquid, change into a peripheral, glottalization, etc. Insertion is more frequent in words starting with a vowel. For example, "ㄴ[n]" is added in front of the second one of two words subject to liaison. Deletion is concurrent with insertion in most cases; the coda of a preceding word is dropped, and a phone is added to the onset of a following word. As described above, phonemes that undergo such phonological changes are indexed with identifiers, to discriminate them from phonemes that are not phonologically changed. Pairs of such phonemes with identifiers and phonemic pairs that are not phonologically changed, which are comprised of the coda of the last syllable of a first word and the onset of the initial syllable of a second word following the first word, are stored together as the inter-word phonetic information. The inter-word phonetic information stored in the inter-word phonetic information storing unit 45 is applied in searching in the search unit 42 and rescoring in the post-processing unit 47 to reduce the number of candidate words or sentences, thereby making the searched results more reliable.

The language model database 46 stores data on the probabilities of occurrence of word sequences represented using a bigram or trigram model based on data on the frequency of occurrence of word sequences in sentences stored in a learning text database. The learning text database is comprised of sentences which are considered by a designer to more frequently appear in speech recognition. The number of sentences for the learning text database is limited by the designer.

The post-processing unit 47 rescores the word sequences searched by the search unit 42 with reference to the inter-word phonetic information stored in the inter-word phonetic information storing unit 45, the acoustic model database 43, the pronunciation dictionary database 44, and the language model database 46, removes the phonetic representations and tags from the final rescored word sequences, and combines the resultant word sequences into syllable clusters to output the result in text form. In particular, an intra-word biphone model is converted into a more expanded inter-word triphone model in a boundary between words with respect to the most likely pronunciation representations obtained through backward searching, and the scores of candidate sentences are recalculated to select a recognition result. As such, by applying the inter-word triphone model, modified from the intra-word biphone model, to most probable candidate sentences, and recalculating the probabilities of acoustic models, recognition performance can be improved without degradation in efficiency.

Each of the feature extraction unit 41, the search unit 42, and the post-processing unit 47 may be implemented using a computing processor, such as a central processing unit (CPU), and a speech recognition program which is executable by the computing processor. The acoustic model database 43, the inter-word phonetic information storing unit 44, the pronunciation dictionary database 45, and the language model database 46 may be implemented using memory devices.

Examples of inter-word phonetic information stored in the inter-word phonetic information storing unit 44 are shown in Table 1.

TABLE 1

| Coda of the Last syllable of First word (C) | Onset of the Initial syllable of Second word (D) | Crossword Information Value |
|---|---|---|
| ŋ(ㅇ) | n(ㄴ) | 0 |
| ŋ(ㅇ) | n(ㄴ) | 1 |
| ŋ(ㅇ) | n(ㄴ) | 2 |
| ŋ(ㅇ) | m(ㅁ) | 0 |
| ŋ(ㅇ) | m(ㅁ) | 1 |
| ŋ(ㅇ) | m(ㅁ) | 2 |
| ŋ(ㅇ) | b(ㅂ) | 0 |
| ŋ(ㅇ) | b(ㅂ) | 1 |
| ŋ(ㅇ) | b(ㅂ) | 2 |
| ŋ(ㅇ) | s(ㅅ) | 0 |
| ŋ(ㅇ) | s(ㅅ) | 1 |
| ŋ(ㅇ) | s(ㅅ) | 2 |
| k(ㄱ) | b1(1)(ㅂ → ㅃ) | 0 |
| k(ㄱ) | b1(1)(ㅂ → ㅃ) | 1 |
| k(ㄱ) | b(ㅂ) | 1 |
| k(ㄱ) | b(ㅂ) | 2 |
| k(ㄱ) | s1(1)(ㅅ → ㅆ) | 0 |
| k(ㄱ) | s1(1)(ㅅ → ㅆ) | 1 |
| k(ㄱ) | s(ㅅ) | 1 |
| k(ㄱ) | s(ㅅ) | 2 |
| ŋ(1)(ㄱ → ㅇ) | n(ㄴ) | 0 |
| ŋ(1)(ㄱ → ㅇ) | m(ㅁ) | 0 |

In Table 1, a number of phonemic pairs, each of which is comprised of the coda of the last syllable of a first word and the onset of the initial syllable of a second word and which are phonologically changed according to practical phonological rules and do not match the phonetic pronunciation corresponding to their spelling, are shown. The phonologically changed phonemic pairs are stored in the inter-word phonetic information storing unit 45 as inter-word phonetic information. For example, when the last syllable of a word having the coda "ㄱ[k]" is followed by a word having an initial syllable beginning with the onset "ㄴ[n]" or "ㅁ[m]", the coda "ㄱ[k]" of the preceding word is practically pronounced as [ŋ], which does not match the phonetic pronunciation corresponding to its spelling, so that the pronunciation representation [ŋ(1)] is linked only to the pronunciation representation [n] or [m] for the onset of the initial syllable of the following word. In this case, only the pronunciation representation with an identifier, [ŋ(1)n], not the combination form with the letters, i.e., "ㄱㄴ→ [ŋ(1)n]", is stored as inter-word phonetic information. Since additional identifiers are also indexed in the pronunciation dictionary database 44, impermissible pronunciation representations that do not comply with practical phonological rules can be constrained so as not to be linked into a sentence even through the inter-word phonetic information storing unit 45 has such a simple pronunciation representation format.

The crossword information value appearing in Table 1 represents whether there is a pause between words in a spoken sentence. A phonological change does not occur between subsequent words when a speaker has paused between the words. Depending on the length of the pause, the crossword information value is represented as one of 0 for no pause, 1 for a short pause, and 2 for a long pause. The onset for the initial syllable of the following word varies depending on the crossword information value with the final syllable of the proceeding word. More than one crossword information values are assigned to each phonetic pair stored in the inter-word phonemic information storing unit 45.

Figure 5A:
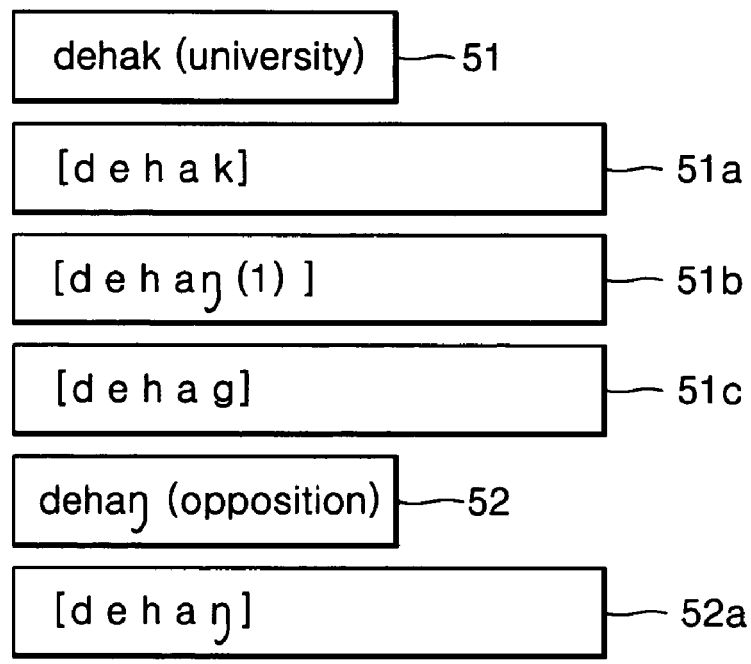
FIGS. 5A and 5B illustrate examples of pronunciation representations stored in a pronunciation dictionary in FIG. 4.

Exemplary pronunciation representations for Korean and English words stored in the pronunciation database 44 will be described with reference to FIGS. 5A and 5B. Referring to FIG. 5A, there are three pronunciation representations [dehak] 51*a*, [dehaŋ(1)] 51*b*, and [dehag] 51*c* for the word "대학[dehak]" 51 and one pronunciation representation [dehaŋ] 52*a* for the word "대항[dehaŋ]" 52. The (1) in the pronunciation representation [dehaŋ(1)] 51*b*, which is a pronunciation representation variation for the word "대학[dehak]" 51 according to practical phonological rules, is an exemplary identifier added to discriminate it from the original pronunciation representation [dehaŋ] 52*a* for the word "대항[dehaŋ]" 52. Such a pronunciation representation variation with an identifier is allowed to precede only a particular pronunciation representation for the onset of the initial syllable of a subsequent word, as shown in Table 1.

Figure 5B:
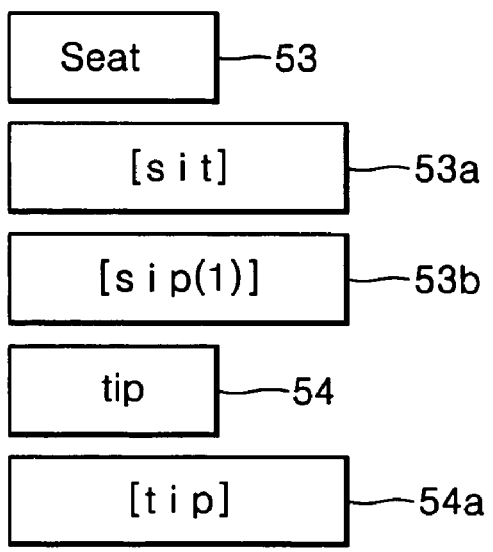

Referring to FIG. 5B, there are two pronunciation representations [sit] 53*a* and [sip] 53*b* for the word 'seat' 53 and one pronunciation representation [tip] 54*a* for the word "tip" 54. Similar to the case of Korean words in FIG. 5B, the (1) in the pronunciation sequence [sip(1)] 53*b*, which is a pronunciation representation variation for the word 'seat' 53 according to practical phonological rules, is an exemplary identifier added to discriminate it from the original pronunciation representation [tip] 54*a* for the word "tip" 54. The pronunciation representation [sip(1)] 53*b* can be linked to only to a subsequent word starting with the phoneme 'b', 'p', or 'm'. For example, the pronunciation representation [sip(1)] 53*b* is not allowed to be linked to the word "down". The pronunciation representation [tip] 54*a* can be linked to any subsequent word regardless of the onset of the initial syllable thereof.

Figure 6:
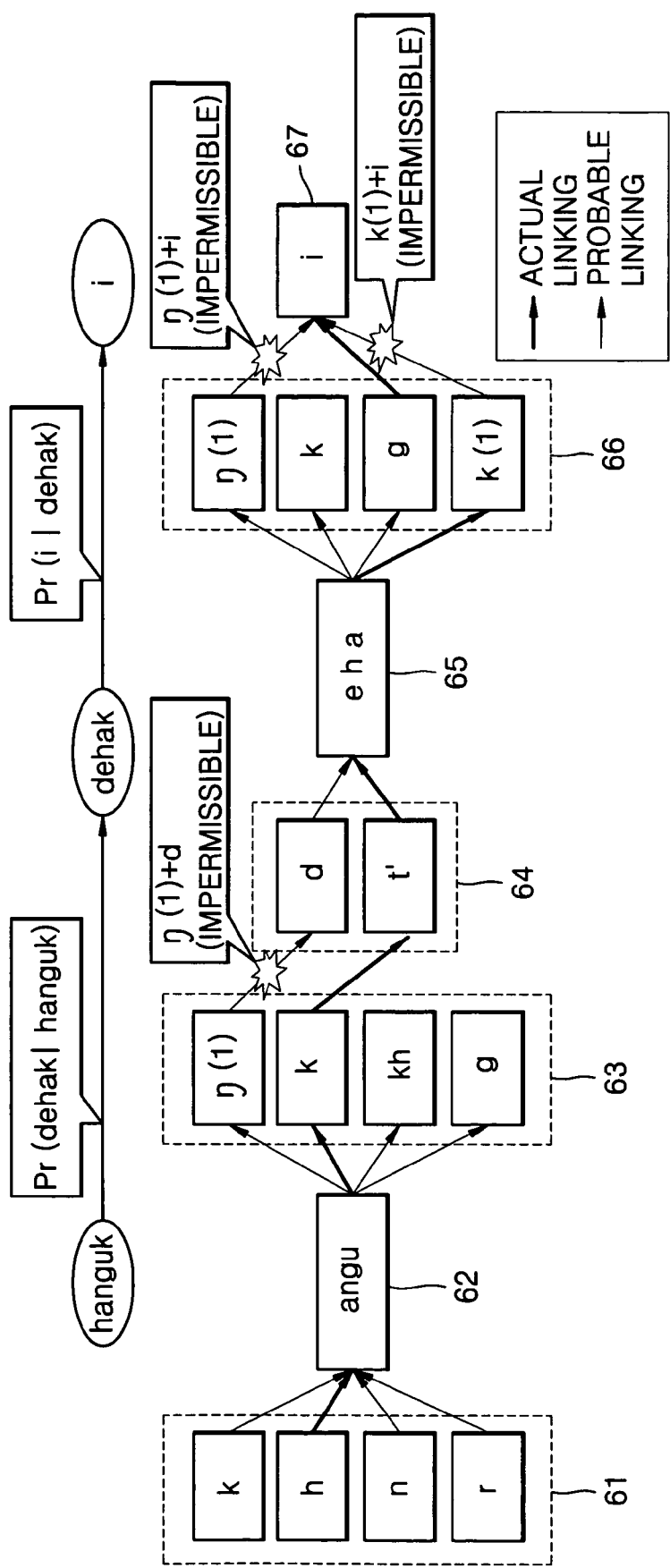
FIG. 6 is a diagram for explaining the operation of a search unit in FIG. 4.

FIG. 6 is for explaining an example of searching performed in the search unit 42 of FIG. 4 using the pronunciation dictionary database 44 and the inter-word phonetic information storing unit 45. Referring to FIG. 6, when it comes to the recognition of the word, "한국대학이[hanguk dehak i]" the word sequence is segmented in predetermined units of recognition, i.e., into separate words, "한국[hanguk]", "대학[dehak]", and "이[i]", and a pronunciation representation network is operated to select the optimal pronunciation representation for each of the words. The pronunciation representation network consists of all probable pronunciation representations for words in a tree structure. Next, searching is performed on the selected pronunciation representations for the words with the probability functions Pr(대학[dehak]|한국[hanguk]) and Pr(이[i]|이[dehak]) with reference to the inter-word phonetic information provided by the inter-word phonetic information storing unit 45. Based on the inter-word phonetic information, linking of the pronunciation representation [ŋ(1)] for the coda of the last syllable of the word "한국" to the pronunciation representation [d] for the onset of the initial syllable of the word "대학", linking of the pronunciation representation [ŋ(1)] for the coda of the last syllable of the word "대학" to the pronunciation representation [i] for the onset of the initial syllable of the word "이", and linking of the pronunciation representation [k(1)] for the coda of the last syllable of the word "대학" to the pronunciation representation [i] for the onset of the initial syllable of the word "이" are blocked, thereby simplifying the overall search network. In other words, when the search unit 42 performs forward and backward searching, whenever a node to node transition occurs, it is determined based on the inter-word phonetic information whether there is any pronunciation representation for the onset of the initial syllable of a word that cannot follow a pronunciation representation for the coda of the last syllable of a word according to practical phonological rules, wherein each word has at least one pronunciation representation for its onset and coda. As a result, such pronunciation representations for the coda and onset of successive words that do not comply with practical phonological rules are constrained so as not to be linked each other for a sentence. Backward searching is a process of constructing written sentences using the candidate words screened through forward searching. In this backward searching, a predetermined number, for example, 10, of candidate written sentences where the candidate words are connected in a best way are constructed using language model probabilities. In a rescoring process, an inter-word biphone model is converted into an inter-word triphone model with respect to the 10 candidate written sentences screened through backward searching, and the probabilities for the 10 candidate written sentences are recalculated using the inter-word phonetic information and acoustic model to select the best written sentence for the input speech.

EXPERIMENTAL EXAMPLE

A performance comparison test was performed using the speech recognition method according to the present invention and a conventional speech recognition method. In a quiet office environment, 600 speakers were asked to read 45000 Korean sentences as training data, and 80 speakers were asked to read 480 Korean sentences as test data. 12-dimension Mel-Frequency Cepstral Coefficients (MFCCs), and energy values and their difference coefficients were used as feature vectors for frames of data, and each frame was expressed as a 26-dimension vector. A 44-basephone, 4000-subword acoustic model of Phonetically-Tied Mixtures (PTMs) and a trigram language model were used for the experiment. 11,000 most frequently used words in political news were used and were recognized as pseudomorphemes. The results of the performance test in the above-conditions are shown in Table 2.

TABLE 2

| Speech Recognition Method | | | Sentence |
|---|---|---|---|
| Pronunciation Dictionary (PD) | Rescoring | Crossword Information | Word Error Rate (%) | Error Rate (%) |
| Conventional PD | X | X | 10.74 | 53.96 |
| Conventional PD | O | X | 9.03 | 48.33 |
| PD according to the present invention | X | X | 8.87 | 47.50 |
| PD according to the present invention | O | X | 7.79 | 42.92 |
| PD according to the present invention | X | O | 7.58 | 41.27 |
| PD according to the present invention | O | O | 6.53 | 40.00 |

Referring to Table 2 above, when using the pronunciation dictionary according to the present invention, the word error rate and sentence error rate decrease compared to using a conventional pronunciation dictionary, thereby improving speech recognition performance. It is also proved that rescoring and using crossword information values in combination with the pronunciation dictionary according to the present invention leads to best speech recognition performance.

The invention may be embodied in a general purpose digital computer by running a program from a computer readable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). The present invention may be embodied as a computer readable medium having a computer readable program code unit embodied therein for causing a number of computer systems connected via a network to effect distributed processing. Functional programs, codes, and code segments for the implementation of the present invention can easily be inferred by programmers having skill in this field.

As described above, a speech recognition method and system according to the present invention can be applied with more ease without increasing the number of sub-words or changing acoustic models and can improve the recognition rate by limiting unallowable word connection based on inter-word phonetic information. Also, there is no burden in decoding since practical phonological rules are not applied during recognition.

Since context information is not constructed on a word-by-word basis, there is no increase in the sizes of a pronunciation dictionary database and a search network. According to the present invention, unlike language-dependent phonological rule applications, probable pronunciation representation variations are created for each word of a language vocabulary, and allowable pronunciation representations for successive words, which are pursuant to practical phonological rules, are automatically selected for word linking. Therefore, the prevent invention can be readily applied to various other languages in addition to Korean.

In the drawings and specification, there have been disclosed typical preferred embodiments of the invention and, although specific terms are employed, they are used in a generic and descriptive sense only and not for purposes of limitation. Therefore, it will be understood by those of ordinary skill in the art that various changes in form and details equivalent to the above embodiments may be made therein without departing from the spirit and scope of the present invention as defined by the following claims.

What is claimed is:

1. A continuous speech recognition method comprising:
    (a) constructing a pronunciation dictionary database including at least one pronunciation representation for each word which is influenced by applying phonological rules, wherein the pronunciation representation for the coda of a first word or the pronunciation representation for the onset of a second word following the first word is additionally indexed with an identifier if it does not match the phonetic pronunciation of its spelling;
    (b) forming inter-word phonetic information in matrix form by combination of a number of all probable phonetic pairs, each of which is basically comprised of the coda of a first word and the onset of a second word following the first word, wherein the coda of the first word or the onset of the second word is indexed with an identifier if they undergo phonological changes; and
    (c) performing speech recognition on feature vectors extracted from an input speech signal with reference to the pronunciation dictionary database and the inter-word phonetic information.

2. The continuous speech recognition method of claim 1, wherein in step (c), a pronunciation representation for the coda of a first word and a pronunciation representation for the onset of a second word following the first word, which do not comply with the phonological rules, are constrained based on the inter-word phonetic information so as not to be linked to each other.

3. The continuous speech recognition method of claim 1, wherein more than one crossword information values are assigned to each phonetic pair in a matrix.

4. A computer readable medium having embodied thereon a computer program for the method according to claim 1.

5. A continuous speech recognition system including an acoustic model database and a language model database which are previously established through learning, the system comprising:
    an inter-word phonetic information storing unit which stores inter-word phonetic information by combination of all probable phonemic pairs, each of which is basically comprised of a coda of last syllable of a first word and an onset of initial syllable of a second word following the first word, wherein the coda of the first word or the onset of the second word is indexed with an identifier if it does not match the phonetic pronunciation of its spelling due to phonological interaction between the first and second words;
    a pronunciation dictionary database including at least one pronunciation representation for each word based on phonological rules, wherein the pronunciation representation for the coda of a first word or the pronunciation representation for the onset of a second word following the first word is additionally indexed with an identifier if it does not match the phonetic pronunciation of the spelling;
    a feature extraction unit which extracts information that is useful for recognition from an input speech signal and converts the extracted information into feature vectors; and
    a search unit which searches most likely word sequences among from the feature vectors obtained in the feature extraction unit using the inter-word phonetic information and with reference to the acoustic model database, the pronunciation dictionary database, and the language model database, and outputs the most likely word sequences in text form as a recognition result.

6. The continuous speech recognition system of claim 5, wherein more than one crossword information values are assigned to each phonetic pair in a matrix.

7. The continuous speech recognition system of claim 5, wherein the search unit constrains linking between a pronunciation representation for the coda of a first word and a pronunciation representation for the onset of a second word following the first word, which do not comply with the phonological rules.

8. The continuous speech recognition system of claim 5, further comprising a post-processing unit which converts an intra-word biphone model into an inter-word triphone model, rescores the acoustic models for the most likely word sequences obtained in the search unit, recalculates the scores of candidate sentences, and selects the best candidate sentence as a recognition result.

* * * * *